US 8,810,726 B2

(12) United States Patent
Diggins (10) Patent No.: US 8,810,726 B2
(45) Date of Patent: Aug. 19, 2014

(54) CHANGING THE TEMPORAL SAMPLE RATE OF A MOTION-IMAGE SEQUENCE (75) Inventor: Joe Diggins, Chesham (GB)

(73) Assignee: Snell Limited, Reading (GB)

(*) Notice: Subject to any disclaimer, the term of this patent is extended or adjusted under 35 U.S.C. 154(b) by 0 days.

(21) Appl. No.: 13/516,550

(22) PCT Filed: Dec. 20, 2010

(86) PCT No.: PCT/GB2010/052165
§ 371 (c)(1),
(2), (4) Date: Jul. 6, 2012

(87) PCT Pub. No.: WO2011/073693
PCT Pub. Date: Jun. 23, 2011

(65) Prior Publication Data
US 2012/0268653 A1 Oct. 25, 2012

(30) Foreign Application Priority Data

Dec. 18, 2009 (GB) .................................. 0922160.7

(51) Int. Cl.
H04N 7/01 (2006.01)
H04N 11/20 (2006.01)
G06F 13/372 (2006.01)
G09G 5/397 (2006.01)

(52) U.S. Cl.
USPC ........... 348/452; 348/459; 348/448; 345/534; 345/546

(58) Field of Classification Search
None
See application file for complete search history.

(56) References Cited

U.S. PATENT DOCUMENTS

| 5,353,119 | A | 10/1994 | Dorricott | |
|---|---|---|---|---|
| 6,452,639 | B1 * | 9/2002 | Wagner et al. | 348/448 |
| 6,480,232 | B1 * | 11/2002 | Wilson et al. | 348/459 |
| 8,212,830 | B2 * | 7/2012 | Ogiso | 345/534 |
| 2008/0192060 | A1 * | 8/2008 | Ogiso | 345/546 |

FOREIGN PATENT DOCUMENTS

| EP | 0 775 421 B1 | 12/2001 |
|---|---|---|
| GB | 2188510 A | 9/1987 |
| WO | 02/37846 A1 | 5/2002 |
| WO | 2007/121342 A2 | 10/2007 |

OTHER PUBLICATIONS

International Search Report and Written Opinion of the International Searching Authority, mailed Apr. 13, 2011, issued in corresponding International Application No. PCT/GB2010/052165, filed Dec. 20, 2010, 10 pages.
Search Report of the Intellectual Property Office of the United Kingdom, mailed Mar. 9, 2010, issued in related Application No. GB 0922160.7, filed Dec. 18, 2009, 8 pages.

* cited by examiner

Primary Examiner — Jefferey Harold
Assistant Examiner — Sean Haiem
(74) Attorney, Agent, or Firm — Christensen O'Connor Johnson Kindness PLLC (57) ABSTRACT A frame-rate conversion system having an interpolation mode and a synchronization mode. The synchronization mode is selected when temporal interpolation confidence is and images can be retimed without dropping or repeating of images. The interpolation mode is selected when the measure of temporal interpolation confidence is high or repeating of images. Images are exchanged between a temporal interpolator and a buffer at an exchange rate which is varied in the interpolation mode to optimise the buffer occupancy for retiming of images without dropping or repeating of images in s subsequent synchronization.

17 Claims, 6 Drawing Sheets

CHANGING THE TEMPORAL SAMPLE RATE OF A MOTION-IMAGE SEQUENCE

FIELD OF INVENTION

This invention concerns changing the temporal sample rate of a motion-image sequence and involves temporal interpolation of images. It is particularly applicable to frame-rate conversion from low frame rates where temporal interpolation is difficult.

BACKGROUND OF THE INVENTION

Conversion of motion-image sequences between different temporal sampling rates such as film frame-rates or video field-rates is well known and is frequently necessary. It is commonly used in television and video systems to convert material between different acquisition, storage and distribution formats. The conversion is usually done by FIR filters that create values for new pixels from a weighed sum of existing pixel values. Motion compensated processing is now often used, in which motion vectors are derived and used to calculate which of the existing input pixels are most likely to represent a particular interpolated output pixel.

The growth in digital cinematography and synergistic developments in the art of high-definition television have resulted in the increasing use of 'film-like' frame rates, such as 24 and 25 frames per second. Most development work on conversion has been based on the conversion of 'television-like' temporal sampling rates, such as 50 or 60 fields per second. Algorithms developed for these higher temporal sampling rates, especially motion-compensated conversion algorithms, have been found to be challenged by the higher inter-frame differences that occur at 24 frames per second. The current invention provides a novel method of overcoming this challenge.

European patent EP 0 775 421 describes a method of conversion between closely-spaced frame rates (i.e. where the difference between the temporal sampling rates is less than about 2 Hz). A temporal interpolation mode is combined with a synchronisation mode, in which input images are re-timed without any temporal interpolation of pixel values. The choice of mode is controlled by the relative temporal phase between the input and output images. The advantage of this technique is that most images are re-timed and any artefacts due to temporal interpolation are limited to short time periods (typically of the order of 500 ms) which occur regularly as the input to output temporal phase cycles. This technique does nothing to hide any artefacts that are produced in the temporal interpolation mode—the mode is selected only on the basis of temporal phase.

SUMMARY OF THE INVENTION

There is provided apparatus for changing the temporal sample rate of a motion-image sequence in which an input image sequence at an input rate is converted to an output image sequence at an output rate, the apparatus comprising a temporal interpolator; a buffer associated with the temporal interpolator; and a controller, wherein the controller is supplied with a measure of temporal interpolation confidence and a measure of buffer occupancy; and wherein the apparatus has an interpolation mode in which the output image sequence is formed by temporal interpolation between images of the input sequence; and a synchronisation mode in which the output image sequence is formed by re-timing images of the input sequence without temporal interpolation images; the controller being adapted to select the synchronisation mode when the measure of temporal interpolation confidence is low and the measure of buffer occupancy indicates that images can be retimed without dropping or repeating of images and to select the interpolation mode when the measure of temporal interpolation confidence is high or when the measure of buffer occupancy indicates that images cannot be retimed without dropping or repeating of images.

An exchange rate at which images are exchanged between the buffer and the temporal interpolator the apparatus may be variable and wherein the controller is further adapted in the interpolation mode in dependence upon the measure of temporal interpolation confidence and the measure of buffer occupancy, to vary said exchange rate to optimise the buffer occupancy for retiming of images without dropping or repeating of images in a subsequent synchronisation.

Where the temporal interpolation is motion compensated using motion vectors and in which the said temporal interpolation confidence measure may be derived from confidence in the motion vectors. Thus, the temporal interpolation confidence measure may derived from the height of a peak in a phase correlation surface; from a displaced-frame or displaced-field difference; or from a measure of the number of motion vectors that point from respective input image pixels to a particular temporally interpolated image pixel.

Alternatively, the measure of interpolation confidence is derived from analysis of the energy spectrum of the input image data.

There is further provided a temporal interpolation method for converting images of an input image sequence having an input image rate to images of an output image sequence having a different output image rate that operates in a temporal interpolation mode during a first portion of the said sequence and in a synchronisation mode for a second portion of the said sequence, the method using a FIFO buffer connected to a temporal interpolator for the exchange of images between the buffer and the temporal interpolator at a buffer image exchange rate; wherein during the said first portion the temporal interpolator provides temporally interpolated images that comprise the respective portion of the said output image sequence; during at least part of the said first portion the buffer image exchange rate is varied with respect to the input or output image rate; and during said second portion the buffer provides the respective portion of the said output image sequence comprising un-interpolated input frames synchronised to the output image rate.

Where an output of the FIFO buffer forms an input to the temporal interpolator, the buffer image exchange rate is varied with respect to the input image rate, preferably increased above the input image rate when the output rate is lower than the input rate and decreased below the input image rate output rate is higher than the input rate.

Where an output of the temporal interpolator forms an input to the FIFO buffer, the buffer image exchange rate is varied with respect to the output image rate, preferably increased above the output image rate when the output rate is higher than the input rate and decreased below the output image rate output rate is lower than the input rate.

There is further provided a method of changing the temporal sample rate of a motion-image sequence in which an input image sequence at an input rate is converted to an output image sequence at an output rate, the method including an interpolation mode in which the output image sequence is formed by temporal interpolation between images of the input sequence; and a synchronisation mode in which the output image sequence is formed by re-timing images of the input sequence without temporal interpolation images; the synchronisation mode being selected when temporal interpolation confidence is low and images can be retimed without dropping or repeating of images and the interpolation mode being selected when the measure of temporal interpolation confidence is high or when images cannot be retimed without dropping or repeating of images. Preferably, images are exchanged between the temporal interpolator and a buffer at an exchange rate which is varied in the interpolation mode to optimise the buffer occupancy for retiming of images without dropping or repeating of images in a subsequent synchronisation.

There is also provided a temporal interpolation system for converting an input image sequence at an input image timing to an output image sequence at a different output image timing, the system comprising a temporal interpolator controlled by an interpolation phase measure; an image buffer that is connected to a temporal interpolator; and an interpolation phase generator that derives a changing interpolation phase measure from comparison of input image timing and the output image timing; wherein the rate of change of the interpolation phase of the temporal interpolator is controlled in response to the fill level of the image buffer and a measure of the likelihood of interpolation artefacts.

The measure of the likelihood of interpolation artefacts may be derived from confidence in the motion vectors or may be derived from analysis of the energy spectrum of the input image sequence.

There is also provided a method and apparatus for changing the temporal sample rate of a motion-image sequence in which an input image sequence at an input rate is converted to an output image sequence at an output rate wherein first portions of the output image sequence are formed by temporal interpolation between images of the input sequence; and, second portions of the output image sequence are formed by re-timing images of the input sequence without temporal interpolation, wherein a measure of temporal interpolation confidence is derived from the content of input images and input images having a high confidence measure contribute to the said first portions; and input images having a low confidence measure contribute to the said second portions.

In a preferred embodiment the said temporal interpolation is motion compensated interpolation using motion vectors and the said motion vectors are derived by phase correlation.

Advantageously the said temporal interpolation confidence measure is derived from the height of a peak in a correlation surface.

In an alternative embodiment the said temporal interpolation confidence measure is derived from a displaced-frame or displaced-field difference.

BRIEF DESCRIPTION OF THE DRAWINGS

An example of the invention will now be described with reference to the drawings in which.

DETAILED DESCRIPTION OF THE INVENTION

Figure 1:
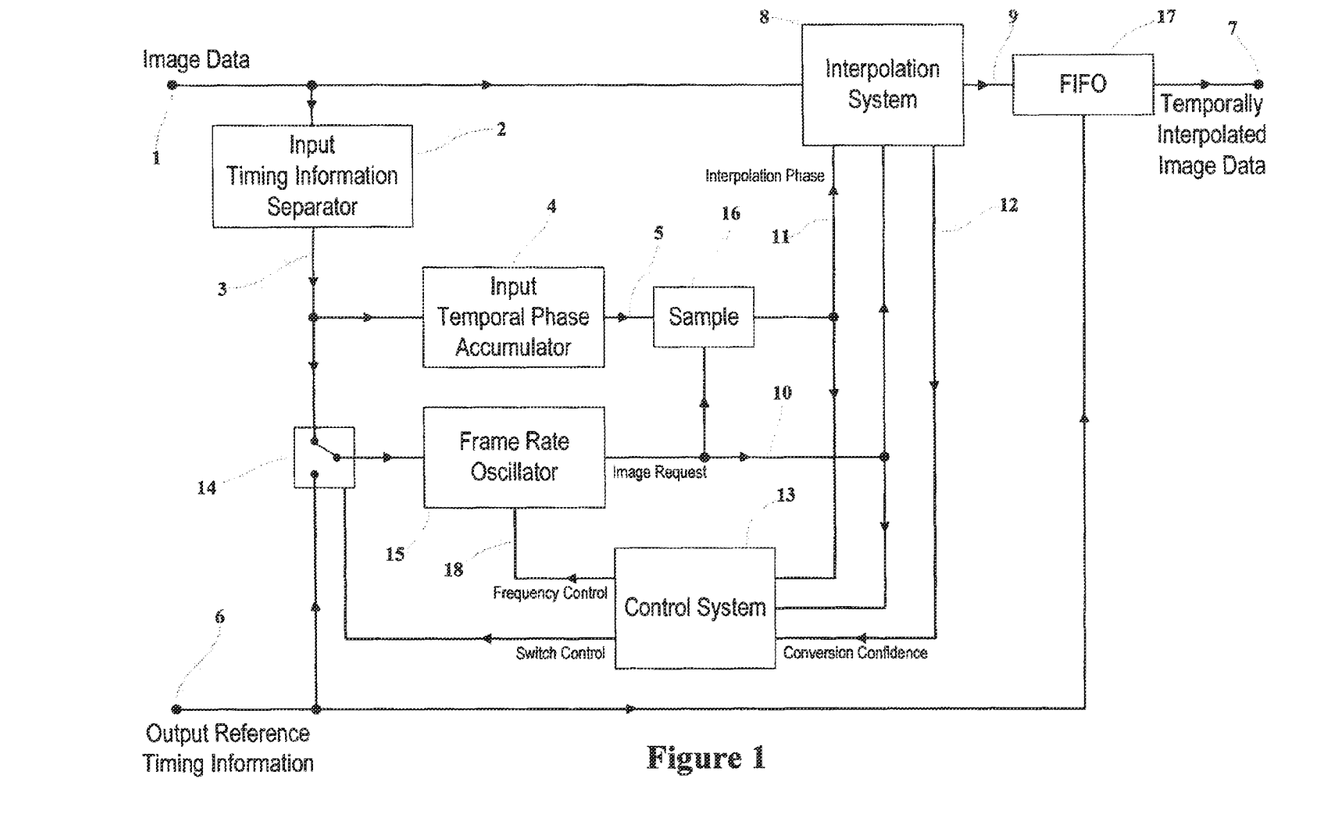
FIG. 1 shows a block diagram of a frame-rate conversion system according to an exemplary embodiment of the invention.

FIG. 1 shows an example of a frame-rate conversion system according to an example of the invention. Temporal interpolation of frame rates is often combined with spatial interpolation, for example 'spatio-temporal' interpolation between interlaced and progressive scanning rasters. The invention is not relevant to spatial interpolation and so it will not be described here. The skilled person will appreciate how spatial interpolation is combined with temporal interpolation according for example to the known art of standards conversion and will be able to combine the novel temporal processing of the invention with known spatial interpolation.

Image data (1) is input to the system. This will typically be chrominance and luminance values for the pixels of a stream of temporal samples of a scene. For example the temporal samples may be television fields or film frames. In the description which follows, the input and output images will be referred to as 'fields' as would be the case in the conversion between interlaced television formats having different field rates. However, as the skilled person will appreciate, either the input or the output images may be film frames, or progressive (i.e. not interlaced) television frames, or any other representation of a temporal sample of a scene.

Timing information is extracted from the image data (1) by an input timing information separator (2) that outputs input image timing data (3) that defines the start time of each of the fields in the image data (1). The timing information separator (2) may be a decoder for timing reference signals included in the image data (1). An input temporal phase accumulator (4) is locked to the input image timing data (3) and produces an input temporal phase signal (5) that has a value of zero at the start of each input field and increases linearly until the start of the next input field, when it returns to zero.

Output reference timing information (6) is also input to the system; this information defines the required output field times and would typically be an output timing reference signal that identifies the required start time of each output field. The system of FIG. 1 derives a stream of temporally interpolated output images (7) comprising fields that are timed according to the output reference timing information (6).

The image data (1) is input to a known temporal interpolation system (8), which converts it to a stream of temporally interpolated fields (9). These interpolated fields are produced in response to an image request signal (10) and an interpolation phase signal (11). When an interpolated image is requested by the signal (10), the interpolation system (8) combines input fields (1) in known manner to derive an interpolated field (9) that has a temporal position between two input fields as defined by the interpolation phase signal (11).

The temporal interpolation system (8) outputs a 'conversion confidence' signal (12). This signal is a measure of the quality of the temporal interpolation, i.e. it is large when few interpolation artefacts are expected, and small when objectionable interpolation artefacts are expected. In a linear (i.e. non-motion-compensated) interpolator this measure could be related to the presence in the input fields of frequency components that are likely to be aliased by the temporal interpolation.

In a preferred embodiment of the invention the interpolation system (8) is a motion-compensated interpolator using motion vectors derived from phase correlation. It is well known to derive a measure of 'motion vector confidence' from the height of the peak in the correlation surface used to derive a motion vector. A suitable conversion confidence measure can be derived from a combination of the peak heights corresponding to the motion vectors used in the conversion. If peaks are high then confidence will be high. If motion vectors are derived by block matching then a combination of match errors, or displaced-frame, or displaced field, differences can be used to derive the conversion confidence measure. If the match errors or displaced-frame/displaced-field differences are low then the confidence will be high. The confidence measure will vary in dependence upon the content of the input fields and typically a new value will be generated for each input field.

Where the confidence derivation is part of a motion estimation process it is likely that this process will precede the actual motion-compensated interpolation process. Typically, adjacent input fields will first be compared to derive motion vectors, then these vectors will be associated with the pixels of these fields and then these vectors will be input to the interpolation process. Thus the confidence value for an interpolated output field will typically be available before that field is created.

A control system (13) responds to the conversion confidence signal (12) and alters the operation of the system when necessary, so as to avoid the output of fields showing interpolation artefacts; this will described in detail below.

First, assume that the conversion confidence signal (12) indicates that the confidence in the interpolation is high, and therefore few artefacts are expected in the interpolated fields (9). The output reference timing information (6) is routed via a switch (14) that is controlled by the control system (13), to an interpolation frame rate oscillator (15). This phase-locks to the signal from the switch (14) to produce the image request signal (10), which samples the input temporal phase signal (5) in a sampler (16). The sampled phase value represents the input phase that corresponds to the output field time defined by the output reference timing information (6). This forms the interpolation phase signal (11). Thus the timing of the interpolated fields (9) corresponds with the output reference timing information (6). These interpolated fields are input to a first-in-first-out buffer (17), whose output is controlled by the output reference timing information (6). Fields are output from this buffer at the required output timing, and these form the stream of temporally interpolated output images (7).

However, if the conversion confidence signal (12) indicates that the confidence in the interpolation by the interpolation system (8) is low, and therefore interpolation artefacts are likely to be present in the interpolated fields (9), then the control system (13) operates to change the setting of the switch (14) so that the interpolation frame rate oscillator (15) is locked to the input image timing data (3). This oscillator is now synchronised with the input temporal phase accumulator (4) (because they both have inputs from the input image timing data (3)), and so the interpolation phase signal (11) from the sampler (16) is always zero. In other words the interpolation system (8) is instructed to produce output fields that are co-timed with its input fields. Typically the interpolation system (8) will pass through the input fields without any modification and no interpolation artefacts will be introduced.

These unmodified fields will not, of course, be timed according to the output reference timing information (6). However provided the buffer (17) contains some fields, they will be retimed by the buffer (17) to the required output timing. Clearly, if the required output rate as defined by the output reference timing information (6) is different from the input rate as defined by the input image timing data (3), the buffer (17) will either fill or empty, and is likely to under- or over-flow. This is avoided by changing the frequency of the frame rate oscillator (15) in response to a frequency control signal (18) from the control system (13). This will be further explained below.

Figure 2:
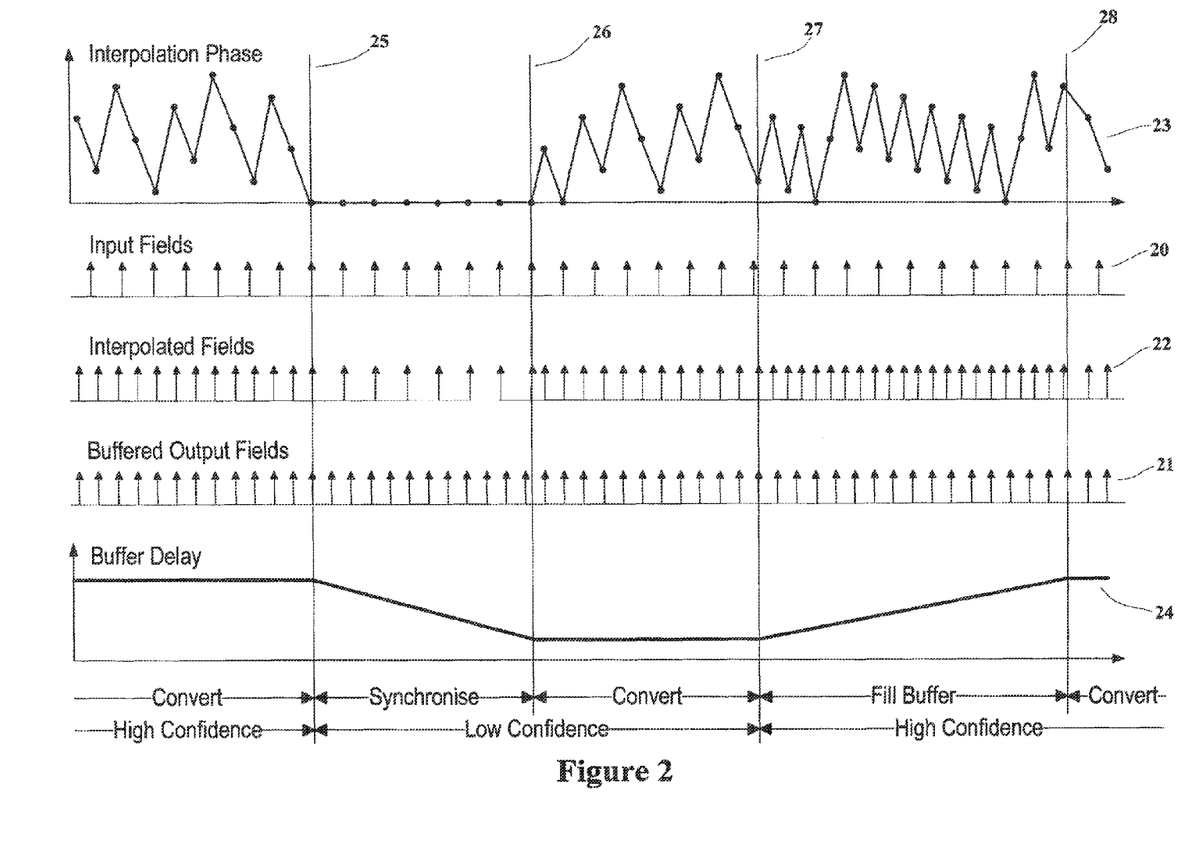
FIG. 2 shows a timing diagram that illustrates the operation of the system of FIG. 1.

The operation of the system of FIG. 1 is further illustrated by the timing diagram of FIG. 2. This Figure shows an example of conversion from a sequence of input field times (20) to a higher field-rate sequence of output field times (21).

Initially (i.e. at the left of the Figure) the interpolation confidence is high and few interpolation artefacts are expected. The interpolation system (8) of FIG. 1 produces a stream of interpolated fields (22) that correspond with the output field times (21). The required interpolation phase for each output field is shown by the points of the graph (23). The interpolation phase values vary cyclically according the difference between the input and output field rates.

As previously explained, the interpolated fields are input to the buffer (17) of FIG. 1 as they are created, and output fields are taken from the buffer at the required output field times. At the left of FIG. 2 the interpolated field times (22) correspond with the output field times (21). The buffer thus holds a fixed number of fields and represents a fixed delay. This delay is shown in the graph (24) where it is assumed that some samples have previously been input to the buffer and there is a finite delay value as a result.

At time (25) the interpolation confidence falls, indicating that interpolated fields are likely to have artefacts. The control system (13) of FIG. 1 then instructs the interpolation system (8) to pass the input fields at their original times without interpolation. The interpolated field times (22) now correspond to the input field times (20), and the corresponding interpolation phase values (23) are all zero. As the output field rate is higher than the input field rate the buffer (17) of FIG. 1 empties, with consequent reduction in its delay, as shown by the graph (24).

At time (26) the buffer is almost empty, and the corresponding delay approaches zero. In order to avoid the temporal discontinuity in output field times that would occur if the buffer under-flowed, the control system reverts to the interpolation of fields at the output field rate. The interpolation phase values (23) now follow the phase difference between the output field times (21) and the input field times (20). And, the buffer delay (24) remains constant at a low value.

Clearly it would be advantageous to fill the buffer so that interpolation artefacts in future output fields can be avoided. This can be done by increasing the field rate of the interpolated fields (22) above the field rate of the output fields (24). However, this increased rate is another potential source of artefacts and it has been found preferable only to do this when the interpolation confidence is high. At time (27) the confidence returns to a high value and the control system increases the rate of the frame rate oscillator (15) of FIG. 1 above the rate of the output fields (21). The interpolation phase values (23) now cycle at the difference between the input field rate and the (artificially high) interpolated field rate. And, the buffer delay (24) increases steadily.

At time (28) the buffer level is sufficiently high to provide un-interpolated output fields during periods of low confidence, and so the control system returns the frequency of the frame rate oscillator (15) of FIG. 1 to the frequency of the output fields (21). Provided the confidence remains high, fields are interpolated and input to the buffer at the required output rate and the buffer delay remains constant at its high value. If the confidence falls, the system returns to its 'synchronisation' mode so as to avoid interpolation artefacts.

Figure 3:
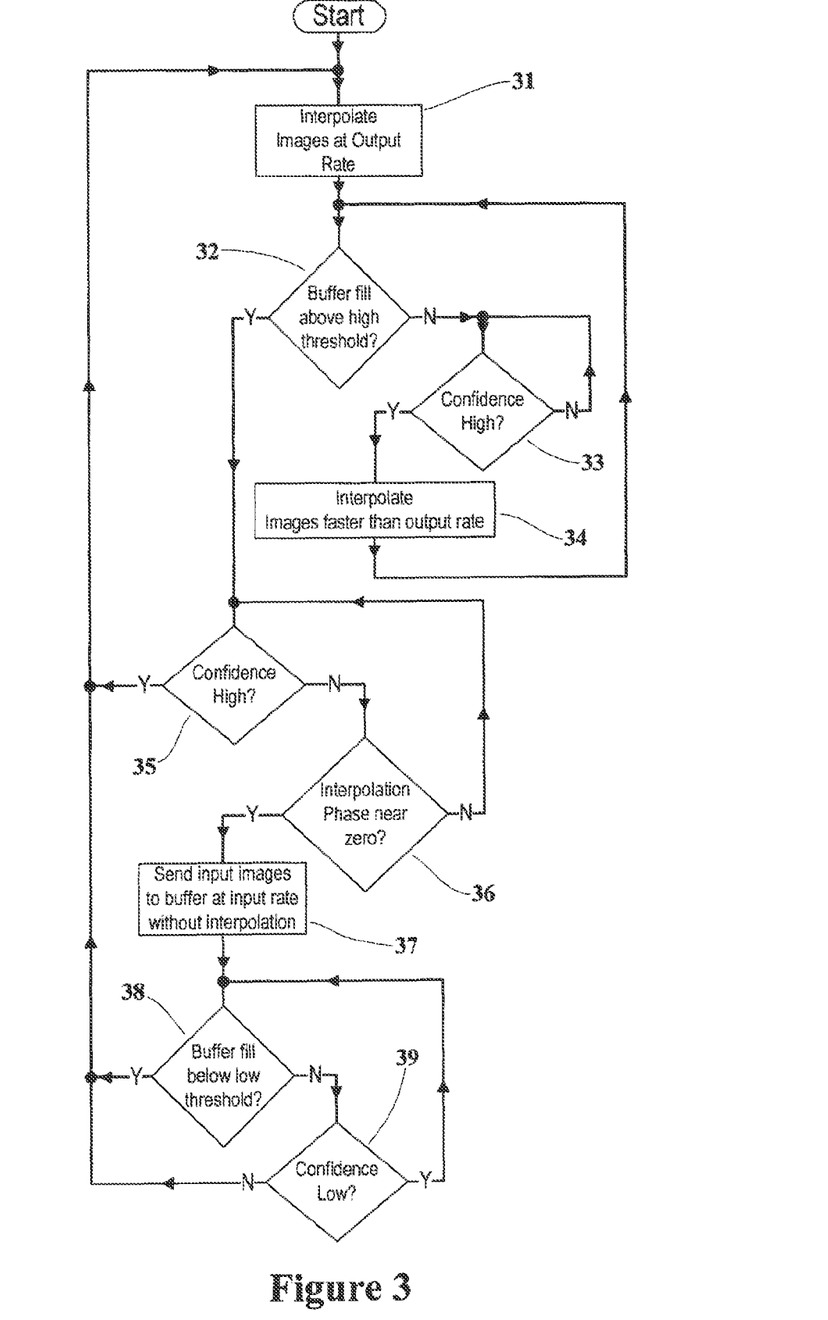
FIG. 3 shows a flow-chart of the control of the system of FIG. 1 where the output frame-rate is higher than the input frame-rate.

An example of suitable control logic to achieve these operations is shown in the flow diagram of FIG. 3. At step (31) fields are interpolated at the required output rate. At step (32) the buffer level is tested against a high threshold to see if is high enough to support expected periods of low confidence. If the level is below the high threshold, the confidence is tested at step (33), and if it is high, the rate of interpolation of fields is increased higher than the output field rate at step (34). If the confidence was low at step (33) the system waits for high confidence before proceeding to step (34).

After changing to the high interpolated field rate at step (34), the process returns to step (32). Once the buffer level is above the high threshold, the test of step (32) directs the process to test the confidence at step (35). If it is high, the processing is returned to step (31) where the rate of the interpolated fields is returned to the required output rate.

If the confidence is low at step (35) the interpolation phase is tested at step (36) to see if it is close to zero. If the confidence is low, and the interpolation phase is close to zero, step (37) changes the operation of the interpolator so that input fields are passed to the buffer at the input field rate without interpolation. This mode of operation is only initiated when the interpolation phase is close to zero so as to avoid a sharp discontinuity in the phase, which could be perceived as an artefact.

Once the system has been put into the 'synchronisation' mode at step (37), the buffer level is tested at step (38) to see if it is above a low threshold; and, if it is, the confidence is tested at step (39) to see if it is still low. If there is a danger that the buffer may under-flow, or the confidence returns to a high level, then the process returns to step (31), which restores conventional temporal interpolation from the input field rate to the output field rate.

So far, the required output rate has been assumed to be faster than the input rate. The invention is equally applicable to the case where the required output rate is slower than the input rate, and the system of FIG. 1 equally applicable. In this case the buffer fills when input fields are passed to the buffer without interpolation. When the interpolation confidence is high the buffer level (i.e. the buffer delay) should ideally be low, so as to be ready for the buffer to fill if confidence falls. The buffer is emptied by interpolating at a rate lower than required output rate. This is achieved in the system of FIG. 1 by the control system (13) sending a suitable frequency control signal (18) to the frame-rate oscillator (15).

Figure 4:
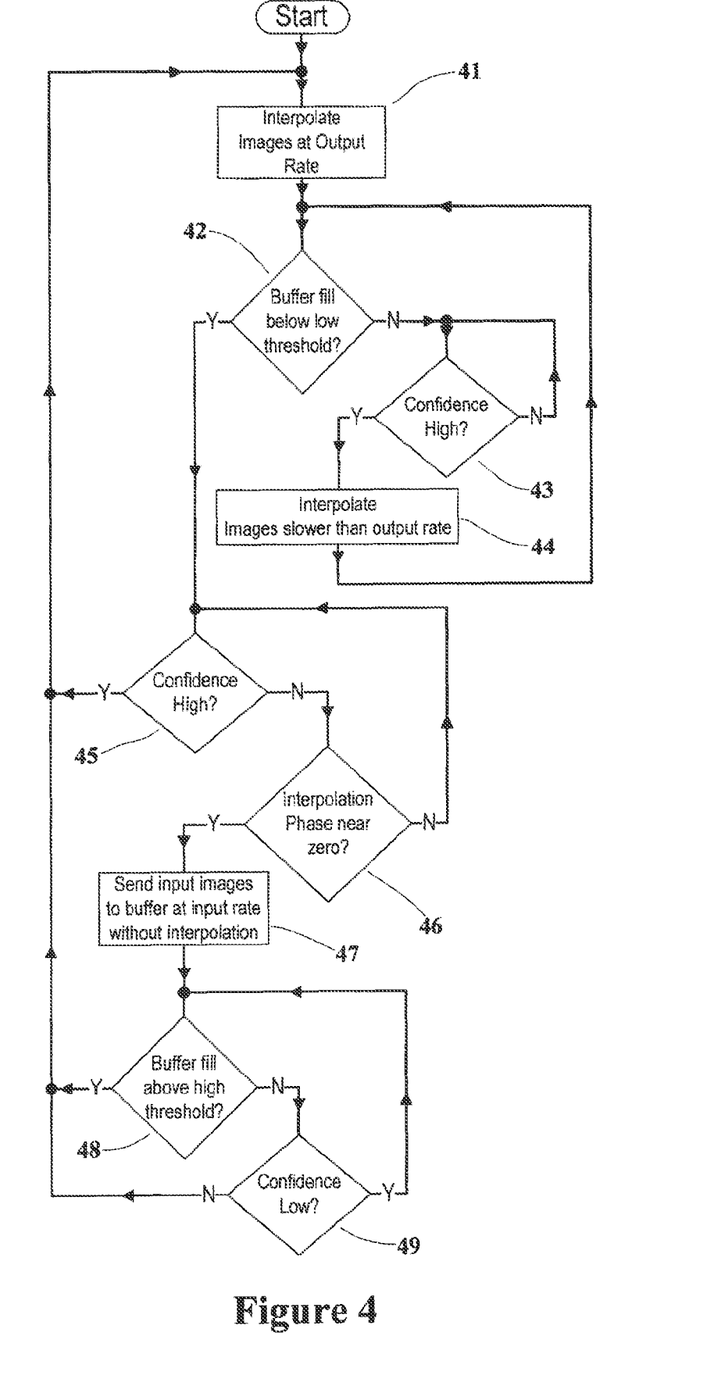
FIG. 4 shows a flow-chart of the control of the system of FIG. 1 where the output frame-rate is lower than the input frame-rate.

The appropriate control logic for this, slower output rate, conversion is shown in the flow chart of FIG. 4. This is very similar to FIG. 3, and analogous steps are given similar reference numerals, starting with 4 rather than 3. The steps which are different, depending on whether the required output rate is higher or lower than the input rate are as follows:

Step (42)/(32)
When the output rate is lower than the input rate the buffer is tested to see if it is below a low threshold.
When the output rate is higher than the input rate the buffer is tested to see if it is above a high threshold.

Step (44)/(34)
When the output rate is lower than the input rate the interpolated rate is made slower than the output rate (so as to fill the buffer).
When the output rate is higher than the input rate the interpolated rate is made faster than the output rate (so as to empty the buffer).

Step (48)/(38)
When the output rate is lower than the input rate the buffer level is tested against a high threshold (to guard against overflow).
When the output rate is higher than the input rate the buffer level is tested against a low threshold (to guard against under-flow).

Clearly the control system needs to make a decision as to which control logic to apply. In typical standards conversion applications the required output rate for a given conversion is always above, or always below, the input rate and so an initial operator instruction, or measurement of the input and output reference field rates, can be used to choose the appropriate mode of operation of the system. When the two frequencies are nearly equal it will usually be more appropriate not to interpolate, and to use a synchronisation technique using a small buffer, perhaps combined with the repetition or deletion of fields to avoid buffer under-flow or overflow.

There are some improvements that can be made to the control logic of FIGS. 3 and 4 to improve the transitions between the 'synchronisation' mode and the 'interpolation' mode. Rather than waiting for the interpolation phase to reach a low value, at steps (36)/(46), before changing to changing to the 'synchronisation' mode. The frequency of the interpolated fields (e.g. the frequency of the frame-rate oscillator (15) in FIG. 1) can be adjusted slightly as soon as the fall in confidence occurs so as to bring the phase difference to a low value within one or two fields, and thus enabling the change to synchronisation to be made sooner. Similarly, the interpolated field frequency can be adjusted to achieve a low interpolation phase value prior to the change from synchronisation to interpolation. By setting the buffer thresholds (as tested at steps (32)/(42) and (38)/(48)) slightly within the acceptable buffer levels, additional time can be made available for achieving phase coincidence without buffer under-flow or overflow.

The above description has assumed a real-time process on streaming data. The invention may also be applied to non-real-time processing, including file-based processing. The invention relies on the ability to vary the field rate at will by interpolation when the confidence is high, in order to compensate for the incorrect instantaneous rate that occurs when interpolation is inhibited during periods of low confidence. The skilled person will appreciate that there are many ways in which a sequence of output images can be formed from temporally interpolated input images and un-interpolated input images, according to an interpolation confidence measure derived from the input images.

In the system of FIG. 1 the buffer (17), that enables temporal interpolation to be avoided when interpolation artefacts are likely, is placed after the temporal interpolation system (8). This need not be the case; it is equally feasible for the buffer to precede the interpolator, and an example of a suitable system is shown in FIG. 5.

Figure 5:
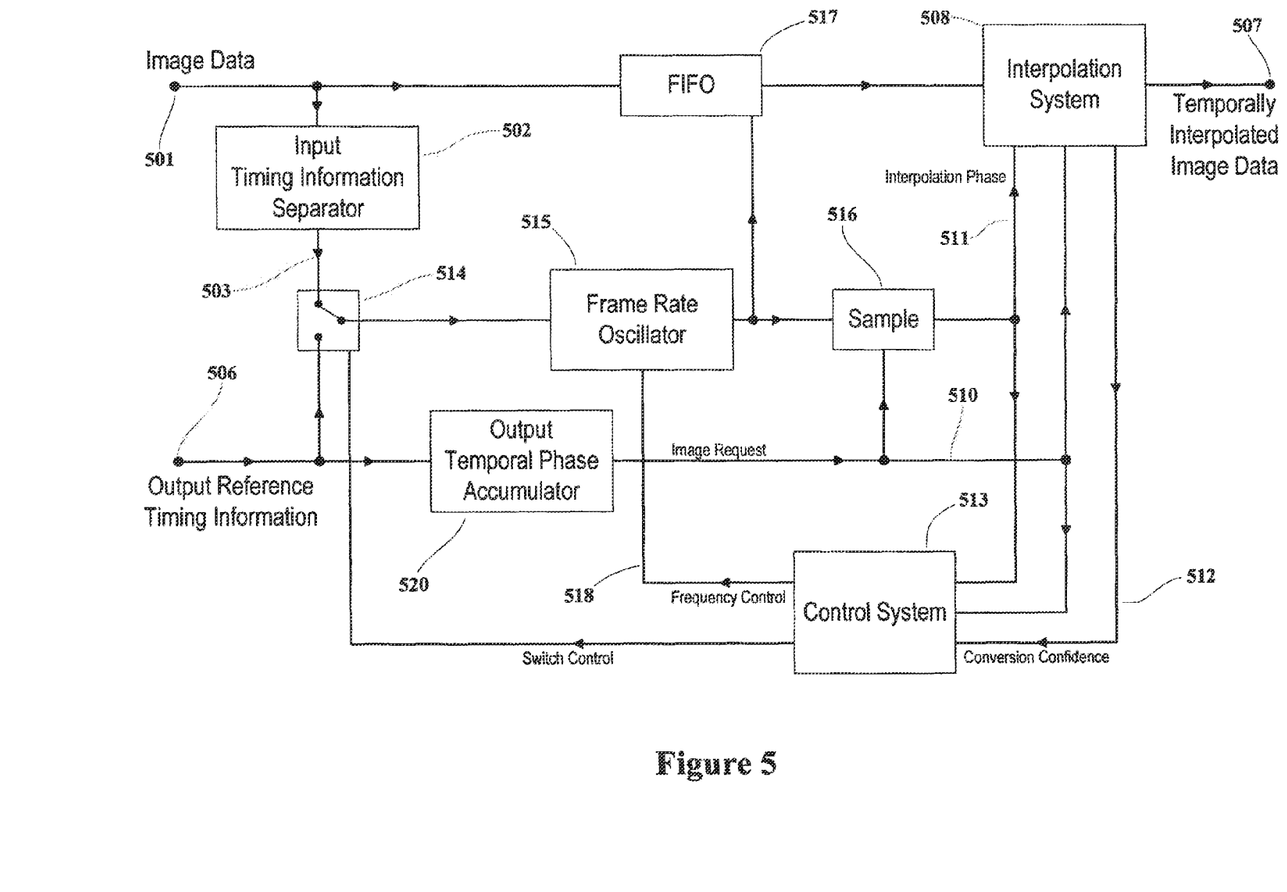
FIG. 5 shows a block diagram of a frame-rate conversion system according to a further exemplary embodiment of the invention.

There are similarities between the system of FIG. 1 and the system of FIG. 5, and analogous elements in the two figures have reference numerals that differ by 500. Referring to FIG. 5, input image data (501) is converted to temporally interpolated image data (507) that is synchronous with output timing reference information (506). The input image data (501) is input to a FIFO buffer (517), and output from the buffer under the control of a frame-rate oscillator (515). When interpolation artefacts are not expected, the frame-rate oscillator (515) is locked to input timing reference timing information that is separated from the input image date (501) by an input timing information separator (502). The separated input timing information is routed by a switch (514) to a reference input of the frame-rate oscillator (515). The delay of the FIFO buffer (517) is thus constant because its input and output frame rates are locked together.

The output from the FIFO buffer (517) is temporally interpolated, by an interpolation system (508), to the frame rate of the output timing information (506). An output temporal phase accumulator (520) computes the required phase of each output field from the output timing reference information (506) and outputs an image request signal (510). This image request signal is sent to the interpolation system (508), in order to request the interpolation of a new output field. The required interpolation phase is determined by a sampler (516) that samples the phase of the frame rate oscillator (515) at the time of the image request signal (510).

When interpolation artefacts are expected, a control system (513) causes the switch (514) to route the output reference timing information (506) to the reference input of the frame-rate oscillator (515). This oscillator is now in phase with the output temporal phase accumulator (520); the interpolation phase is thus zero, and the interpolation system (508) passes its input fields to the temporally interpolated data output (507) without any temporal interpolation. Provided that the FIFO buffer (517) neither over- nor under-flows, it outputs (delayed) input fields at the required output rate under the control of the frame-rate oscillator (515).

The control system (513) manages the fill level of the FIFO buffer (517). When up-converting to a higher frame rate, there is a risk of buffer under-flow, but the buffer can be filled by reducing the frequency of the frame-rate oscillator (515) below the frame rate of the input image data (501). When down-converting to a lower frame rate there is a risk of buffer overflow, but the buffer can be emptied by increasing the frequency of the frame-rate oscillator (515) above the frame rate of the input image data (501).

Thus, as for the system of FIG. 1, the buffer may be filled or emptied by modifying the rate of change of interpolation phase. When the FIFO buffer is placed after the temporal interpolator, the buffer is filled by increasing the frame-rate at the interpolator output above the required output frame-rate, and emptied by reducing the frame rate at the interpolator output below the required output frame-rate. When the FIFO buffer precedes the temporal interpolator, the buffer is filled by reducing the frame-rate at the interpolator input below the frame rate of the input image data, and emptied by increasing the frame rate at the interpolator input above the frame-rate of the input image data.

Therefore, the above-described interpolation systems each have three modes of operation:
Interpolation, where the buffer fill level is constant;
Synchronisation, where the buffer level is changing; and,
Buffer adjustment, where interpolation to or from a frame-rate other than the input frame-rate or the output frame-rate takes place and the buffer level changes in the opposite direction to the synchronisation mode.

A summary of the operation of each these modes, for up- and down-conversion, and for the two different positions of the FIFO buffer is as follows:

TABLE 1

| Direction of Conversion | Position of Buffer | Mode of Operation | Description |
|---|---|---|---|
| Up-Conversion Output field-rate is higher | Buffer after interpolator | Conversion | Interpolator interpolates new fields at output rate. Buffer fill level is constant. |

TABLE 1-continued

| Direction of Conversion | Position of Buffer | Mode of Operation | Description |
|---|---|---|---|
| than input field rate. | | Synchronisation | Unmodified input fields are input to buffer. Buffer empties. |
| | | Buffer adjustment | Interpolator interpolates new fields faster than output rate. Buffer fills. |
| | Buffer precedes interpolator | Conversion | Interpolator interpolates new fields at output rate. Buffer fill level is constant. |
| | | Synchronisation | Unmodified input fields are taken from buffer at output rate. Buffer empties. |
| | | Buffer adjustment | Interpolator takes input fields from buffer slower than input rate. Buffer fills. |
| Down-Conversion Output field rate is lower than input field-rate. | Buffer after interpolator | Conversion | Interpolator decimates input fields to create new fields at output rate. Buffer fill level is constant. |
| | | Synchronisation | Unmodified input fields are input to buffer. Buffer fills. |
| | | Buffer adjustment | Interpolator decimates input fields to create new fields slower than output rate Buffer empties. |
| | Buffer precedes interpolator | Conversion | Interpolator decimates input fields to create new fields at output rate. Buffer fill level is constant. |
| | | Synchronisation | Unmodified input fields are taken from the buffer at output rate. Buffer fills. |
| | | Buffer adjustment | Interpolator takes input fields from buffer faster than input rate. Buffer empties. |

The systems which have been described above avoid the need to drop or repeat fields when synchronising (as opposed to temporally interpolating), which is a significant disadvantage of prior-art systems that combine temporal interpolation and synchronisation modes. In the present invention the buffer is prepared in advance for future periods of synchronisation by adjusting its fill level. During this preparation, which is the 'buffer adjustment' described above, the frame-rate difference across the temporal interpolator is increased to a value greater than that between the input field-rate and the required output field-rate. As has been explained previously, this is achieved by changing the frame-rate at the interface between the buffer and the temporal interpolator. During periods of synchronisation the frame-rate at the input to the buffer is the input frame rate and the frame rate at the output from the buffer is the required output frame-rate; no frames are dropped or repeated and the fill level of the buffer changes (depending on the direction of conversion, up or down).

The use of the term FIFO (first-in-first-out) is not intended to imply a limitation to any particular implementation of the buffer function. The skilled person will appreciate that there are many ways in which a sequence of input frames or fields can be retimed without changing their order of presentation and without dropping or repeating fields or frames. For example, suitable addressing of a block of semiconductor memory could be used, or appropriate instructions for a processor.

The measure of temporal interpolation confidence that controls the choice between temporal interpolation and re-timing of input images without temporal interpolation need not necessarily be derived from the temporal interpolation process. It can be derived from;
- analysis of the content of input images, or metadata associated with the input images;
- a motion estimation process;
- a comparison between an input image and a temporally interpolated image; or,
- a 'picture building' process that uses the motion vectors to construct temporally interpolated images.

Input images can be monitored to determine whether they contain spatial, temporal or spatio-temporal frequency components (including alias components) that are likely to cause interpolation artefacts. For example, the input images can be input to one or more suitable spatial, temporal or spatio-temporal filters that pass such frequencies, and the energy at the filter output used to derive an interpolation confidence measure that is low when significant energy levels are found. An approximate energy measure can be formed by rectification of a filter output and summation over the image area, alternatively a filter output value can be squared and a summation of squares made over the image area.

The use of the height of a peak or peaks in a correlation surface derived by phase correlation has already been described. Alternatively, known methods of cross-correlation between the values of pixels in adjacent input image can also be used to derive a correlation function, and the height of a peak or peaks in that function may be used to control a process according to the invention. When the peaks are high, the confidence in the temporal interpolation is high.

The use of displaced field or frame differences between an input image and a temporally interpolated image has already been described in relation to block matching—such comparisons can be made using images temporally interpolated by any known method of motion compensated temporal interpolation. Where the difference between a motion compensated input image displaced by one or more respective motion vectors and an appropriate undisplaced input image is low, the confidence in the temporal interpolation is high.

An interpolation confidence measure can be derived from a picture building process by evaluating the number of motion vectors that project input image pixels to a given temporally interpolated output pixel, as described in International Patent Application WO 2004/02598. If only one vector 'points' from an input pixel to a particular output pixel, then it is likely that that output pixel has been correctly interpolated, and the confidence in the interpolation will be high. If no vectors point to that output pixel, or if more than one vector points to it, then the likelihood of correct interpolation is low and the confidence in the interpolation will be low.

In some cases a measure of interpolation confidence can be obtained by comparison of the input images with temporally interpolated images, for example by using one or more of the methods for determining measures of interpolation artefacts described in UK patent application 1002865.2. Where the measure of interpolation artefacts is low, the confidence in the interpolation will be high.

It has already been mentioned that the confidence measure may be available prior to the actual interpolation of new pixels. When the buffer precedes the interpolator, the buffer delay can provide extra time in which to derive the confidence measure from analysis of the input image data.

In described embodiments of the invention, the temporal offset between the input and output images varies according to the fill level of the buffer. Generally, this variation is not objectionable; however, when the images need to be synchronised with some other material, such as accompanying audio or metadata, variations in temporal offset may be undesirable. The acceptability of variations in temporal offset may differ depending on the content of the video, for example 'lipsync' is important when speaking characters are portrayed, but is less important if the audio is background music. Therefore, in another aspect of the invention, a control input is provided to the control system (13) of FIG. 1 that indicates the acceptability of temporal offset. When this input indicates that temporal offset is undesirable, a positive weighting (or gain increase) is applied to the interpolation confidence measure so as to reduce the use of temporal interpolation and increase the use of re-timing.

Figure 6:
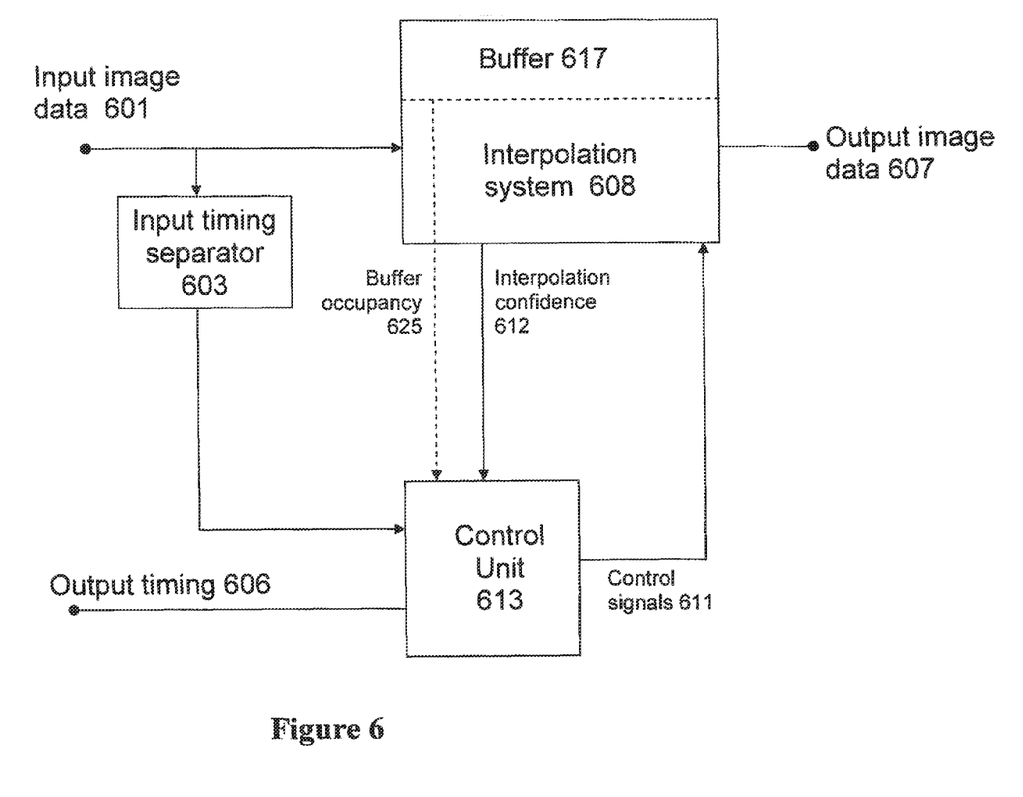
FIG. 6 shows a block diagram of a frame-rate conversion system according to a further exemplary embodiment of the invention

Following the above described examples, a simplified block diagram representing an embodiment of the invention is shown in FIG. 6. Image data (601) is input to the system. Timing information is extracted from the image data (601) by an input timing information separator (602) that outputs input image timing data that defines the start time of each of the fields in the image data (6011). Output reference timing information (606) is also input to the system; this information defines the required output field times and would typically be an output timing reference signal that identifies the required start time of each output field.

The image data (601) is input to a temporal interpolation system (608) with an associated buffer (617) which may be connected at the input or the output of the temporal interpolation system (608). The temporal interpolation system (608) outputs a 'conversion confidence' signal (612). This signal is a measure of the quality of the temporal interpolation, i.e. it is large when few interpolation artefacts are expected, and small when objectionable interpolation artefacts are expected. In a linear (i.e. non-motion-compensated) interpolator this measure could be related to the presence in the input fields of frequency components that are likely to be aliased by the temporal interpolation. The signal 612 is passed to a control unit (613) along with a buffer occupancy measure (625). It will be understood that the buffer occupancy measure may be inferred by the control unit and that a discrete signal path from the buffer to the control unit is not necessarily required and appears for clarity of understanding.

The control system (613) responds to the conversion confidence signal (612) and the buffer occupancy measure (625) to alter the operation of the system when necessary, so as to avoid so far as possible the output of fields showing interpolation artefacts and to avoid the necessity of dropping or repeating fields when retiming. Operation of the control unit (613) may be in accordance with Table 1 above. The control signals (611) may operate upon the interpolation system in a variety of ways evident to the skilled man. Switching of the input of a frame rate oscillator between input and output timings is just an example of how the controller may operate to select the synchronisation mode when the measure of temporal interpolation confidence is low and the measure of buffer occupancy indicates that images can be retimed without dropping or repeating of images and to select the interpolation mode when the measure of temporal interpolation confidence is high or when the measure of buffer occupancy indicates that images cannot be retimed without dropping or repeating of images.

The invention claimed is:

1. Apparatus for changing the temporal sample rate of a motion-image sequence in which an input image sequence at an input rate is converted to an output image sequence at an output rate, the apparatus comprising;
- a temporal interpolator, which serves to provide a measure of temporal interpolation confidence which measure varies in dependence upon the content of the images being interpolated and which is low when objectionable interpolation artefacts are expected;
- a buffer associated with the temporal interpolator and having a buffer occupancy which varies between full and empty limits; and
- a controller supplied with said measure of temporal interpolation confidence and a measure of said buffer occupancy;
- wherein the apparatus has:
  - an interpolation mode in which the output image sequence is formed by temporal interpolation between images of the input sequence; and
  - a synchronisation mode in which the output image sequence is formed by re-timing of images of the input sequence without temporal interpolation images, with said buffer occupancy varying accordingly, it being necessary to drop or repeat an image if the buffer occupancy reaches a limit;
- the controller being adapted to select the synchronisation mode when the measure of temporal interpolation confidence is low and the measure of buffer occupancy indicates that images can be retimed without dropping or repeating of images and to select the interpolation mode when the measure of temporal interpolation confidence is high or when the measure of buffer occupancy indicates that images cannot be retimed without dropping or repeating of images.

2. Apparatus according to claim 1, wherein an exchange rate at which images are exchanged between the buffer and the temporal interpolator is variable and wherein the controller is further adapted in the interpolation mode in dependence upon the measure of temporal interpolation confidence and the measure of buffer occupancy, to vary said exchange rate to optimise the buffer occupancy for retiming of images without dropping or repeating of images in a subsequent synchronisation.

3. Apparatus according to claim 1 in which the said temporal interpolation is motion compensated interpolation using motion vectors and in which the said temporal interpolation confidence measure is derived from confidence in the motion vectors.

4. Apparatus according to claim 1, wherein the measure of interpolation confidence is derived from analysis of the energy spectrum of the input image data.

5. Apparatus according to claim 1, wherein the measure of interpolation confidence is derived from a measure of interpolation artefacts present in an interpolated image sequence obtained by comparison of an image parameter of the said interpolated image sequence with a corresponding image parameter of an input image sequence and the said image parameters are temporally aligned prior to comparison by temporal interpolation of one or both of the said image parameters.

6. Apparatus according to claim 1, wherein selection of modes depends further on a control parameter describing the acceptability of variations in the temporal difference between the portrayal of events in the said input image sequence at an input image rate and the portrayal of the said events in the said output image sequence at an output image rate.

7. A temporal interpolation method for converting images of an input image sequence having an input image rate to images of an output image sequence having a different output image rate that operates in a temporal interpolation mode during a first portion of the said sequence and in a synchronisation mode for a second portion of the said sequence, the method using a FIFO buffer connected to a temporal interpolator for the exchange of images between the buffer and the temporal interpolator at a buffer image exchange rate; wherein
- during the said first portion the temporal interpolator provides temporally interpolated images that comprise the respective portion of the said output image sequence;
- during at least part of the said first portion the buffer image exchange rate is varied with respect to the input or output image rate; and
- during said second portion the buffer provides the respective portion of the said output image sequence comprising un-interpolated input frames synchronised to the output image rate.

8. A method according to claim 7, wherein an output of the FIFO buffer forms an input to the temporal interpolator and wherein during said part of the said first portion the buffer image exchange rate is varied with respect to the input image rate.

9. A method according to claim 8, wherein during said part of the said first portion the buffer image exchange rate is increased above the input image rate when the output rate is lower than the input rate and decreased below the input image rate output rate is higher than the input rate.

10. A method according to claim 7, wherein an output of the temporal interpolator forms an input to the FIFO buffer and wherein during said part of the said first portion the buffer image exchange rate is varied with respect to the output image rate.

11. A method according to claim 10, wherein during said part of the said first portion the buffer image exchange rate is increased above the output image rate when the output rate is higher than the input rate and decreased below the output image rate output rate is lower than the input rate.

12. A non-transitory computer program product adapted to cause data processing apparatus to implement a method of changing the temporal sample rate of a motion-image sequence in which an input image sequence at an input rate is converted to an output image sequence at an output rate, the method including an interpolation mode in which the output image sequence is formed by temporal interpolation between images of the input sequence; and a synchronisation mode in which the output image sequence is formed by re-timing images of the input sequence without temporal interpolation images; the synchronisation mode being selected when temporal interpolation confidence which varies in dependence upon the content of the images being interpolated and which is low when objectionable interpolation artefacts are expected, is low and images can be retimed without dropping or repeating of images and the interpolation mode being selected when the measure of temporal interpolation confidence is high or when images cannot be retimed without dropping or repeating of images.

13. A computer program product according to claim 12, wherein images are exchanged between the temporal interpolator and a buffer at an exchange rate which is varied in the interpolation mode to optimise the buffer occupancy for retiming of images without dropping or repeating of images in a subsequent synchronisation.

14. A computer program product according to claim 12, wherein selection of modes depends further on a control parameter describing the acceptability of variations in the temporal difference between the portrayal of events in the said input image sequence at an input image rate and the portrayal of the said events in the said output image sequence at an output image rate.

15. A temporal interpolation system for converting an input image sequence at an input image timing to an output image sequence at a different output image timing, the system comprising:

a temporal interpolator controlled by an interpolation phase measure; an image buffer that is connected to a temporal interpolator; and an interpolation phase generator that derives a changing interpolation phase measure, there being provided a measure of the likelihood of interpolation artefacts, which measure varies in dependence upon the content of the images being interpolated;

from comparison of input image timing and an output image timing;

wherein the rate of change of the interpolation phase of the temporal interpolator is controlled in response to the fill level of the image buffer and said measure of the likelihood of interpolation artefacts.

16. A system according to claim 15 in which the said temporal interpolation is motion compensated interpolation using motion vectors and in which the said measure of the likelihood of interpolation artefacts is derived from confidence in the motion vectors.

17. A system according to claim 15, wherein said measure of the likelihood of interpolation artefacts is derived from analysis of the energy spectrum of the input image sequence.

* * * * *

UNITED STATES PATENT AND TRADEMARK OFFICE
CERTIFICATE OF CORRECTION

Page 1 of 1

PATENT NO. : 8,810,726 B2
APPLICATION NO. : 13/516550
DATED : August 19, 2014
INVENTOR(S) : J. Diggins It is certified that error appears in the above-identified patent and that said Letters Patent is hereby corrected as shown below:

In The Claims

| COLUMN | LINE | ERROR |
|---|---|---|
| 13 | 5 | "apparatus comprising;" should read |
| (Claim 1, | line 4) | --apparatus comprising:-- |

Signed and Sealed this
Twenty-eighth Day of April, 2015

Michelle K. Lee
*Director of the United States Patent and Trademark Office*